United States Patent
Gasseling

[11] Patent Number: 5,305,824
[45] Date of Patent: Apr. 26, 1994

[54] OIL FILTER COOLER

[76] Inventor: John B. Gasseling, P.O. Box 15208, Phoenix, Ariz. 85060

[21] Appl. No.: 127,252

[22] Filed: Sep. 27, 1993

[51] Int. Cl.⁵ .................. F28F 5/00; B01D 24/00; B01D 29/00; B01D 35/18
[52] U.S. Cl. .................. 165/47; 165/80.1; 165/86; 165/183; 165/184; 165/119; 210/186; 269/254 CS; 269/287; 24/567
[58] Field of Search .......... 165/47, 119, 181, 183, 165/184, 185, 901, 80.1, 80.2, 80.3, 80.4, 80.5, 81, 86; 123/196 AB, 41.33; 210/184, 186; 269/254 CS, 287; 24/567

[56] References Cited

U.S. PATENT DOCUMENTS

| | | | |
|---|---|---|---|
| 1,764,278 | 6/1930 | Olby | 24/567 |
| 2,673,721 | 3/1954 | Dickinson | 165/80.3 |
| 2,798,695 | 7/1957 | Arleque | 165/80.1 |
| 2,879,041 | 3/1959 | Ross | 165/80.3 |
| 3,002,729 | 10/1961 | Welsh | 165/183 |
| 3,091,736 | 5/1963 | Germain | 165/80.3 |
| 3,280,907 | 10/1966 | Hoffman | 165/80.3 |
| 3,284,664 | 11/1966 | Morin et al. | 165/80.3 |
| 3,656,547 | 4/1972 | Beach | 165/183 |
| 3,774,681 | 11/1973 | Wirtanen | 165/184 |
| 3,819,194 | 6/1974 | Grevich et al. | 269/254 CS |
| 4,211,208 | 7/1980 | Lindner | 165/46 |
| 4,236,578 | 12/1980 | Kreith et al. | 165/185 |
| 4,244,098 | 1/1981 | Barcus | 165/80.3 |
| 4,390,060 | 6/1983 | Reinke et al. | 165/901 |
| 4,442,819 | 4/1984 | Veade | 210/186 |
| 4,457,360 | 7/1984 | Roose | 165/80.3 |
| 5,060,716 | 10/1991 | Heine | 165/183 |

FOREIGN PATENT DOCUMENTS

| | | | |
|---|---|---|---|
| 0692164 | 10/1930 | France | 165/184 |
| 0212692 | 12/1984 | Japan | 165/184 |
| 0636615 | 5/1950 | United Kingdom | 165/184 |
| 0636910 | 5/1950 | United Kingdom | 165/183 |

*Primary Examiner*—John K. Ford

[57] ABSTRACT

A oil filter cooler composed of extension springs that encircle the outside circumference of a oil filter. The extension springs are secured by a loose leaf ring that puts tension on the extension springs to keep them from sliding off the oil filter. The extension spring is made of music wire, although, the best results for convection would be to use an aluminum or copper based extension spring.

2 Claims, 4 Drawing Sheets

OIL FILTER COOLER

BACKGROUND OF THE INVENTION

This invention relates to a finned arrangement(extension spring) that is used to remove heat from a hot liquid(motor oil).

It is known from the reference "Heat Transfer", Holman, Sixth Edition, Mcgraw-Hill, 1986, pp. 43-49, that applying a finned arrangement to another surface can be used to remove heat from a hot liquid. The heat transfer from the hot liquid to the finned arrangement is by a process known as convection.

SUMMARY OF THE INVENTION

It is a principal object of the present invention to reduce the temperature of motor oil by using extension springs. The present invention is reusable, and would be used during the hot summer months.

The object is achieved by the extension springs utilizing a process known as convection. The extension springs are increasing the thermal conductivity of the oil filter thereby increasing the temperature dissipation of the motor oil as it passes through the oil filter.

DETAILED DESCRIPTION

Figure 4:
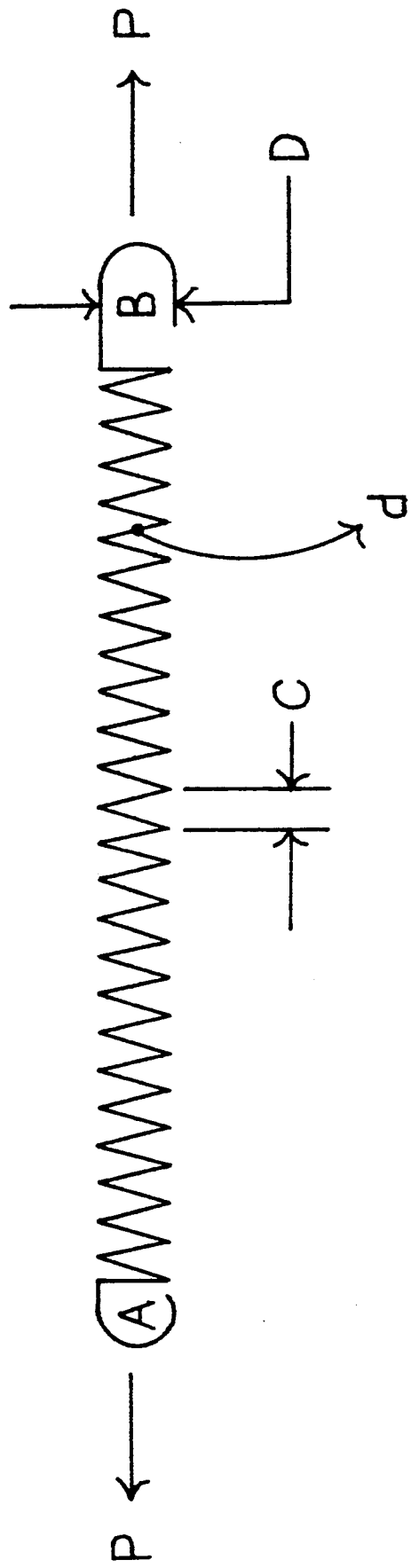
FIG. 4 is a side view of an extended extension spring.

The extension spring as shown in FIG. 4 has the following standard parameters. Pitch(C): not less than $\frac{1}{8}''$, diameter(D): not less than $\frac{1}{4}''$ and not greater than $\frac{1}{2}''$, wire diameter (d): not less than 0.025" or greater than 0.08", load(P): not greater than 3LB, end (A): is a circular loop, and end (B): is a hook loop. The extension spring length will vary according to the circumference of each oil filter.

Figure 3:
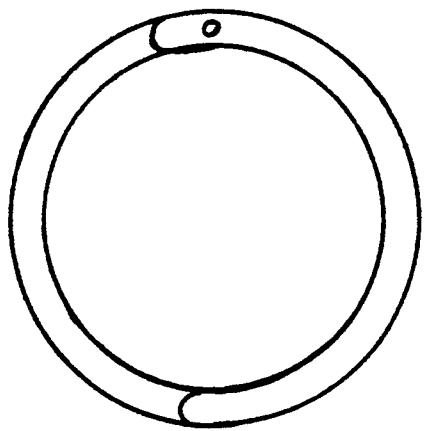
FIG. 3 is a top perspective of different sizes of loose leaf rings.
Figure 3:
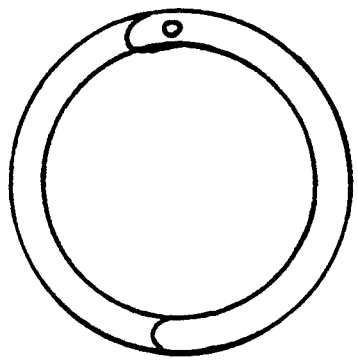
Figure 3:
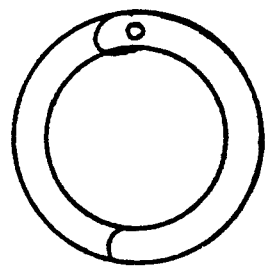
Figure 3:
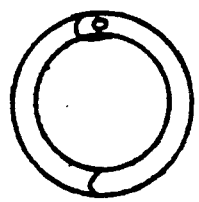

FIG. 3 shows four different sizes of a closed loose leaf ring. These loose leaf rings will vary in size based on the number of extension springs that a particular oil filter can accommodate.

Figure 2:
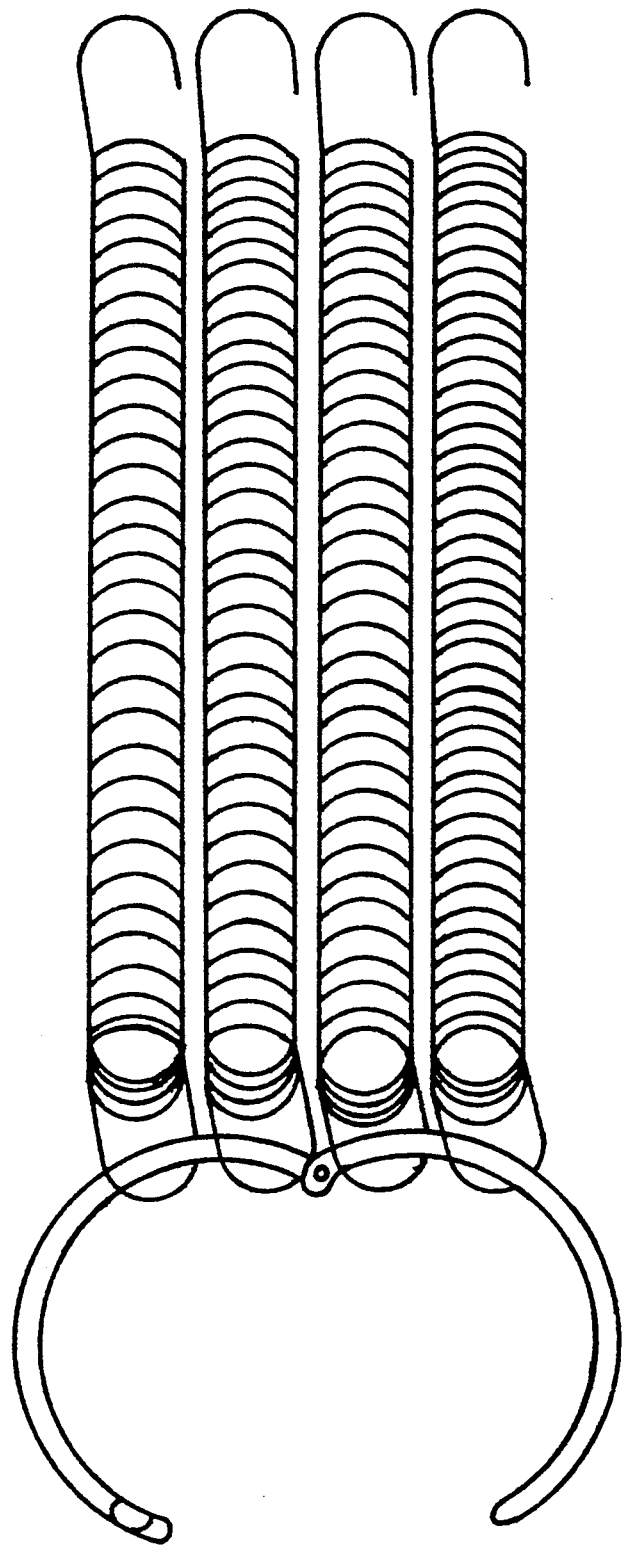
FIG. 2 is a top perspective of the present invention.

FIG. 2 shows four extension springs attached to a open loose leaf ring. As shown in FIG. 4 end (A) is looped over the open loose leaf ring.

Figure 1:
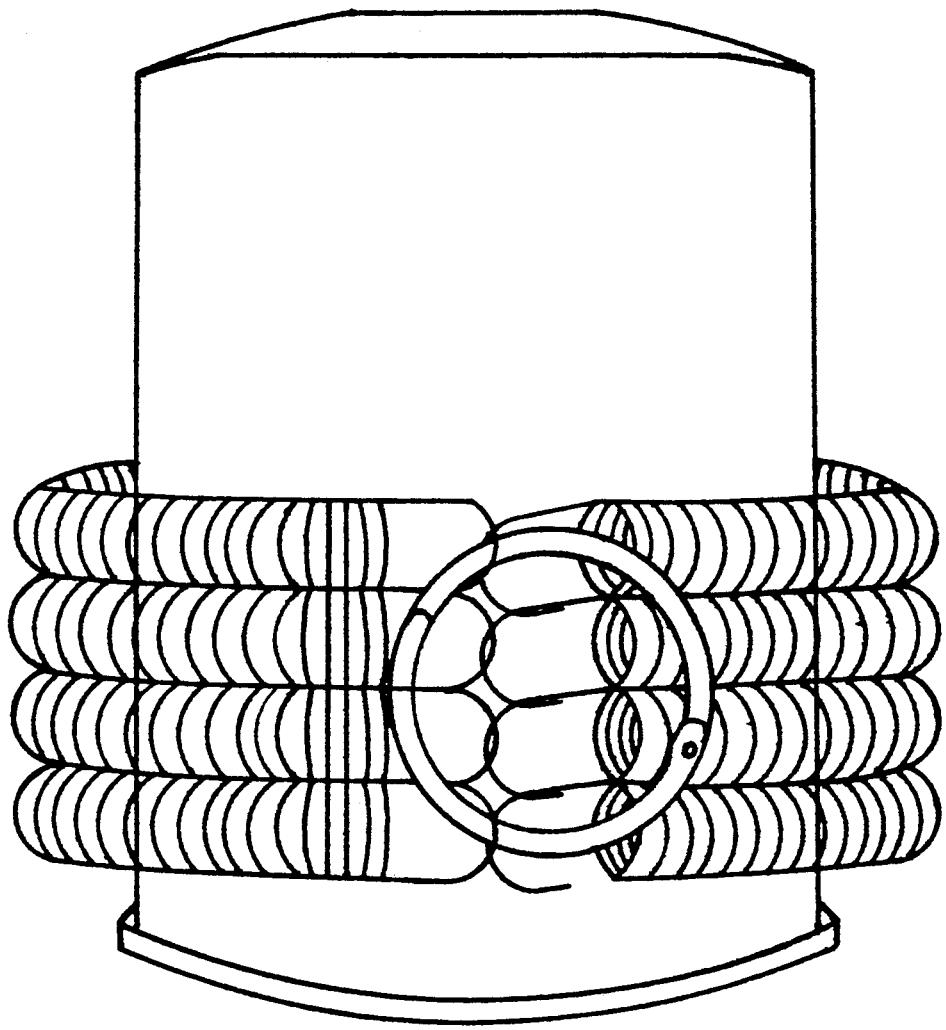
FIG. 1 is a side perspective of the present invention encircling the outside circumference of a oil filter.

In FIG. 1 the extension springs are individually pulled over the top of the oil filter with end (B) hooked to end (A). An open loose leaf ring is then looped through end (A) of the extension springs. The open loose leaf ring is then closed to give the extension springs a secure fit around the outside circumference of the oil filter. The extension spring is made of music wire, although, the best results for convection would be to use an aluminum or copper based extension spring.

I claim:

1. A oil filter cooler comprising extension springs connected together by a loose leaf ring, wherein said extension springs and said loose leaf ring encircle the outside circumference of a oil filter.

2. The said extension springs in claim 1, wherein said extension springs on one end have a circular loop, and on the other end have a hook loop, wherein said loose leaf ring in claim 1 is passed through the said circular loop of said extension springs, wherein said loose leaf ring is in a closed position.

* * * * *